United States Patent
Sohm et al.

(10) Patent No.: US 7,484,053 B2
(45) Date of Patent: Jan. 27, 2009

(54) CROSS-REFERENCING CACHE LINE ADDRESSES WITH CORRESPONDING NAMES

(75) Inventors: Oliver P. Sohm, Toronto (CA); Brian Cruickshank, Oakville (CA)

(73) Assignee: Texas Instruments Incorporated, Dallas, TX (US)

( * ) Notice: Subject to any disclaimer, the term of this patent is extended or adjusted under 35 U.S.C. 154(b) by 320 days.

(21) Appl. No.: 11/383,418

(22) Filed: May 15, 2006

(65) Prior Publication Data

US 2006/0259697 A1    Nov. 16, 2006

Related U.S. Application Data

(60) Provisional application No. 60/681,427, filed on May 16, 2005, provisional application No. 60/681,496, filed on May 16, 2005.

(51) Int. Cl.
G06F 12/00 (2006.01)
(52) U.S. Cl. ...................................................... 711/154
(58) Field of Classification Search ................. 711/124, 711/141, 154; 717/124, 134
See application file for complete search history.

(56) References Cited

U.S. PATENT DOCUMENTS

| | | | |
|---|---|---|---|
| 2005/0102572 A1* | 5/2005 | Oberlaender | 714/29 |
| 2006/0075060 A1* | 4/2006 | Clark | 709/213 |
| 2006/0265542 A1* | 11/2006 | Shen et al. | 711/3 |
| 2007/0043531 A1* | 2/2007 | Kosche et al. | 702/182 |
| 2007/0083720 A1* | 4/2007 | Pullen et al. | 711/158 |

OTHER PUBLICATIONS

"Section 8 Programming," Analog Devices, Inc., 1995-2006, 67 pp., [online], http://www.analog.com/processors/training/seminarMaterials/ADST-170-SEC-8-Programming-V1.4.pdf.

"Visual DSP++4.0 User's Guide," Rev. 1.0, Jan. 2005, Part No. 82-000420-02, Analog Devices, Inc., 432 pp., [online], http://www.analog.com/processors/epManualsDisplay/0,2795,,00.html?SectionWeblawid=207&ContentID=61119&Language=English.

* cited by examiner

*Primary Examiner*—Kevin L Ellis
(74) *Attorney, Agent, or Firm*—Robert D. Marshall, Jr.; W. James Brady; Frederick J. Telecky, Jr.

(57) ABSTRACT

An information carrier medium containing software that, when executed by a processor, causes the processor to receive information from caches on different cache levels. The caches comprise a plurality of cache line addresses, each cache line address associated with a corresponding name. The software causes the processor to display the information on a graphical user interface (GUI), the GUI cross-referencing each of the cache line addresses with a corresponding name.

20 Claims, 6 Drawing Sheets

CROSS-REFERENCING CACHE LINE ADDRESSES WITH CORRESPONDING NAMES

CROSS-REFERENCE TO RELATED APPLICATIONS

This application claims the benefit of U.S. Provisional Application Ser. No. 60/681,496, filed May 16, 2005, titled "Debug Cache Views," and U.S. Provisional Application Ser. No. 60/681,427, filed May 16, 2005, titled "Debugging Software-Controlled Cache Coherence," both of which are incorporated by reference herein as if reproduced in full below.

This application also may contain subject matter that may relate to the following commonly assigned co-pending applications incorporated herein by reference: "Writing To A Specified Cache," Ser. No. 11/383,349, filed May 15, 2006, "Determining The Presence of A Virtual Address In A Cache," Ser. No. 11/383,354, filed May 15, 2006, "Bypassing Cache Information," Ser. No. 11/383,374, filed May 15, 2006, "Visualizing Contents and States of Hierarchical Storage Systems Across Multiple Cores," Ser. No. 11/383,379, filed May 15, 2006, "Determining Differences Between Cached Copies of an Address," Ser. No. 11/383,385, filed May 15, 2006, "Displaying Cache Information Using Mark-Up Techniques," Ser. No. 11/383,385, filed May 15, 2006, "Prioritizing Caches Having A Common Cache Level," Ser. No. 11/383,448, filed May 15, 2006, "Providing Information Associated With A Cache," Ser. No. 11/383,459, filed May 15, 2006, "Providing Cache Status Information Across Multiple Cache Levels," Ser. No. 11/383,461, filed May 15, 2006, "Visualizing Contents and States of Hierarchical Storage Systems," Ser. No. 11/383,462, filed May 15, 2006, and "Re-assigning Cache Line Ways," Ser. No. 11/383,463, filed May 12, 2006.

BACKGROUND

Software applications often use caches and other memory local to the caches to store data during execution. While a software application is being developed, it is often useful to monitor such caches because the data contents and states of the caches often indicate whether the software application is executing properly and/or optimally. For this reason, improvements in cache monitoring techniques are desirable.

SUMMARY

The problems noted above are solved in large part by techniques for obtaining information from computer system caches and/or memories and manipulating the information to display most or all of the contents and states of the caches and/or memories. An illustrative embodiment comprises an information carrier medium containing software that, when executed by a processor, causes the processor to receive information from caches on different cache levels. The caches comprise a plurality of cache line addresses, each cache line address associated with a corresponding name. The software causes the processor to display the information on a graphical user interface (GUI), the GUI cross-referencing each of the cache line addresses with a corresponding name.

Another illustrative embodiment includes a system comprising a cache subsystem configured according to a hierarchy comprising a plurality of cache levels, at least some of the cache levels comprising cache line addresses and at least some of the cache line addresses associated with a corresponding name. The system also comprises a control logic coupled to the cache subsystem, the control logic adapted to collect information from different cache levels and to provide the information to a processor. The processor displays the information on a graphical user interface (GUI), the GUI cross-referencing each of the cache line addresses with a corresponding name.

Yet another illustrative embodiment includes a method comprising collecting information from different levels of a storage system hierarchy, the levels comprising multiple entry addresses, at least some of the entry addresses associated with corresponding names. The method also comprises transferring the information from the storage system to a control logic coupled to the storage system and displaying the information on a display coupled to the control logic. The information is displayed using a graphical user interface (GUI) that cross-references each of the entry addresses with a corresponding name.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "mark-up technique" refers to a technique whereby a text, symbol, etc. is modified so that, when displayed, the text, symbol, etc. is distinguished from other texts, symbols, etc. Examples of mark-up techniques include highlighting, emboldening, underlining, italicizing, adjusting color, adjusting font, etc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are techniques for obtaining information from computer system caches and/or memories and manipulating the information to display most or all of the contents and states of the caches and/or memories. More specifically, the techniques may be used by a host computer to visualize the contents of a plurality of caches and/or memories stored on a target device (e.g., a circuit board) being tested and/or debugged by the host computer. The contents and states of the caches and/or memories are provided to an end-user of the host computer to assist in debugging software stored on the circuit board.

Figure 1:
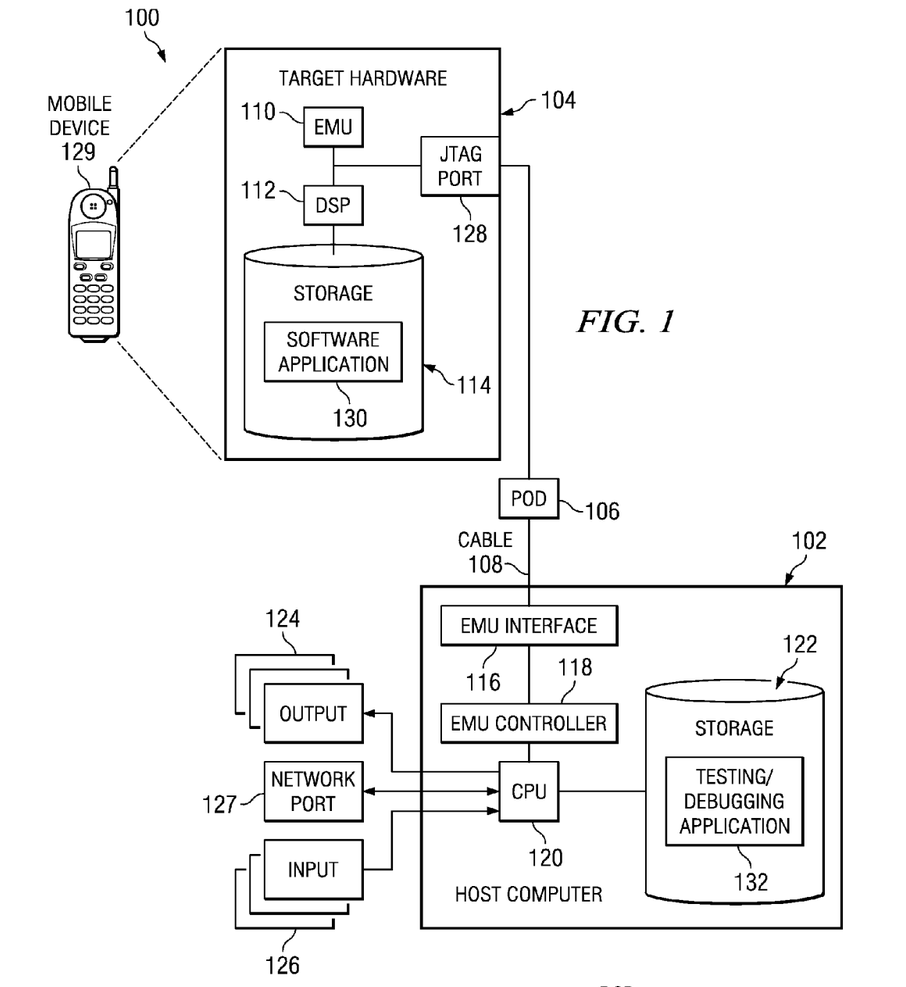
FIG. 1 shows a block diagram of a testing system in accordance with embodiments of the invention.

FIG. 1 shows an illustrative testing system 100 in accordance with embodiments of the invention. The testing system 100 comprises a general purpose host computer 102 and target hardware 104 coupled via a traffic management pod 106 and a cable 108. The pod 106 comprises various components which manage data traffic between the target hardware 104 and the host computer 102, such as buffers, memory, etc. The cable 108 preferably couples with the target hardware 104 via a Joint Test Action Group (JTAG) port 128, although other connection techniques also are within the scope of disclosure. In at least some embodiments, the target hardware 104 may be, or may be incorporated into, a mobile communication device 129, such as a mobile phone, a personal digital assistant (e.g., a BLACKBERRY® device), or other type of electronic system. The target hardware 104 and the host computer 102 are now described in turn.

In some embodiments, the target hardware 104 comprises a megacell or a system-on-chip (SoC) which includes a control logic such as a digital signal processor (DSP) 112, a storage 114 (e.g., random access memory (RAM)) and an emulation/debug logic (EMU) 110. The storage 114 stores one or more software applications 130 (e.g., embedded applications) which, when executed by the DSP 112, perform any suitable function associated with the target hardware 104. The EMU 110 comprises circuit logic which supports testing and debugging of the software application 130. Specifically, the EMU 110 may "emulate" a missing or unavailable component(s) of the target hardware 104 so that a software developer may determine how the component(s), were it actually present on the hardware 104, would perform in various situations (e.g., how the component(s) would interact with the software application 130). In this way, the software application 130 may be debugged in an environment which resembles post-production operation.

Figure 2:
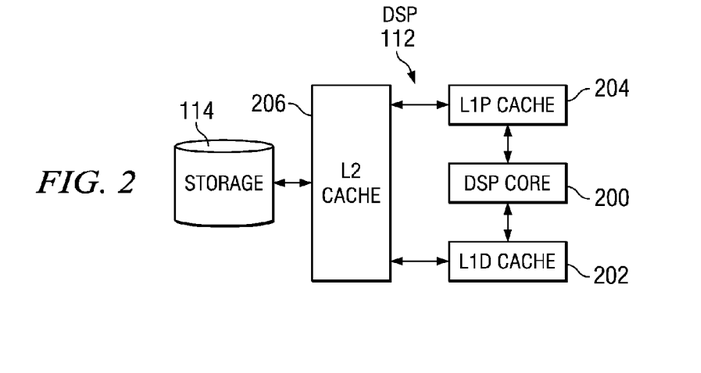
FIG. 2 shows a block diagram of a digital signal processor in the system of FIG. 1, in accordance with embodiments of the invention.

The DSP 112 comprises multiple memory caches which store information frequently accessed from the storage 114, thereby increasing the execution speed of the software application 130. Accordingly, as shown in FIG. 2, the DSP 112 comprises a core 200 which couples to a first-level data (L1D) cache 202, a first-level program (L1P) cache 204 and a second-level (L2) cache 206 coupled to memory external to the DSP 112 (e.g., the storage 114). The L1D cache 202 comprises data, the L1P cache 204 comprises program instructions and the L2 cache 206 comprises a "unified" cache storing data, program instructions and/or other types of information. The L1D cache 202 and the L1P cache 204 are considered to be at a "higher" level than the L2 cache 206, and the L1D cache 202, the L1P cache 204 and the L2 cache 206 are considered to be at higher levels than the storage 114. The L1D cache 202 and the L1P cache 204 preferably are accessed faster than the L2 cache 206, which preferably is accessed faster by the core 200 than the storage 114. For example, the DSP 112 may have a processor speed of 600 MHz, the L1D cache 202 and the L1P cache 204 may have access speeds of 600 MHz, the L2 cache 206 may have an access speed of 300 MHz, and the storage 114 may have an access speed of about 100 MHz. The scope of disclosure is not limited to any particular architecture or number of cores or caches. Any number of cores and/or caches may be used.

In at least some embodiments, the core 200 comprises two access paths to memory (e.g., caches and/or the storage 114), known as the instruction fetch path and the data access path. The instruction fetch path is a dedicated fetch path for fetching instructions from memory for execution by the core 200. The data access path is a dedicated path for accessing data from memory. The L1P cache 204 is associated with the instruction fetch path, and the L1D cache 202 is associated with the data access path. Thus, if the core 200 initiates an instruction request through the instruction fetch path, the requested address is allocated in the L1P cache 204. Likewise, if the core 200 initiates a data request through the data access path, the requested address is allocated in the L1D cache 202.

If the core 200 executes code which requires data stored at a particular address in memory, the core 200 first determines whether the L1D cache 202 contains the address. If the address is found in the cache (a cache "hit"), the core 200 retrieves the data from the L1D cache 202 at that address. If the L1D cache 202 does not contain the address (a cache "miss"), the core 200 then determines whether the next-fastest cache, the L2 cache 206, contains the address. If the memory reference hits in the L2 cache 206, the core 200 retrieves the data in the L2 cache 206 at that address. If the reference misses in the L2 cache 206, the core 200 obtains the data from memory (e.g., storage 114) external to the DSP 112. Likewise, if the core 200 executes code which requires an instruction stored at a particular address in memory, the core 200 first determines whether the L1P cache 204 contains the address. If the address is found in the cache (a "hit"), the core 200 retrieves the instruction in the cache at that address. If the L1P cache 204 does not contain the address (a "miss"), the core 200 then determines whether the next-fastest cache, the L2 cache 206, contains the address. If the address is found in the L2 cache 206, the core 200 retrieves the instruction in the L2 cache 206 at that address. If the L2 cache 206 does not contain the address, the instruction is obtained from storage 114. In some embodiments, a cache miss causes the information to be brought into the cache so that the information will be available the next time the core 200 tries to access it.

Figure 3:
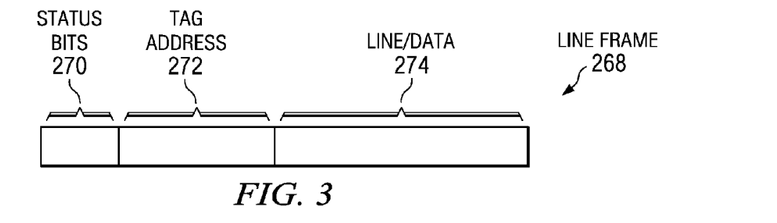
FIG. 3 shows an illustrative line frame which may be used in the caches of the digital signal processor of FIG. 2, in accordance with embodiments of the invention.

At least some caches in the DSP 112 comprise a plurality of line frames which may be used to store data and/or instructions (hereinafter collectively referred to as "data"). As shown in FIG. 3, a line frame 268 is a data structure which stores a predetermined amount of data 274 in addition to status bits 270 and a tag address 272 associated with the data. In at least some embodiments, a line frame may store approximately 32 bytes of data known as a "line." In other embodiments, an amount of data 274 stored per line frame 268 in one cache may differ from an amount of data stored per line frame in another cache. In some embodiments, the status bits 270 indicate whether the line 274 in a line frame 268 is valid, and if valid, whether the line 274 is "dirty." A line is considered to be "dirty" when the line has been updated with a data value which has not been used to update a corresponding line in a lower level memory. For example, if a line in an L1 cache is updated but a corresponding line in the L2 cache is not updated with the same value, the L1 cache line is dirty. The scope of disclosure is not limited to including any particular information in each line or line frame. The information contained in a line frame may be the same as, different than, similar to, less than or greater than that which is specifically disclosed herein.

Each line in a cache is associated with a different address. An illustrative 32-bit address comprises a tag address (e.g., bits 31:14) such as tag address 272, a set address (e.g., bits 13:5) and an offset or NULL value (e.g., bits 4:0). Lines (and associated line frames) having a common set address are mapped into a group known as a "set." Because lines within a set share a common set address, the lines within the set are distinguished from one another using the tag address of each line. Thus, if the core 200 is accessing cache data stored at a particular 32-bit address, the core 200 uses the set address in bits 13:5 to locate a matching set in the cache, and then uses the tag address in bits 31:14 to locate a matching line within the set.

In accordance with preferred embodiments of the invention, each cache also has a specific number of "ways." A collection of corresponding line frames across all sets in a cache is called a "way" in the cache. The number of ways in a cache also corresponds to the number of line frames present in each set of the cache. For instance, a two-way cache has two ways, and each set in the cache has two line frames associated with that set, where each of the two line frames is associated with one of the two ways. As a result, data to be allocated to a particular set has two possible line frame destinations.

In some embodiments, each cache stores various information pertaining to the line frames in that cache. For example, the line frames in a set may be ranked or ordered based on how recently each line frame was accessed. In an illustrative set comprising five line frames, the most recently accessed line frame (e.g., accessed for a data read or write) may be ranked first, and the least recently accessed line frame may be ranked last. Alternatively, the least recently accessed line frame may be ranked first, and the most recently accessed line frame may be ranked last. Such rankings may be termed "least recently used" (LRU) rankings. In operation, when new data is to be stored in a set, the LRU rankings may be used to determine which line frame was least recently accessed. The data in the line frame which was least recently accessed may be removed, or "evicted," to make room for the new data to be stored in that line frame.

Although the scope of disclosure is not limited to any particular number or type of cache, use of the LRU rankings to evict data preferably is performed in the context of set-associative caches. More specifically, a set-associative cache contains multiple line frames per set within which data from each lower-level memory location may be held. For example, in a two-way set associative cache, data from a single memory location in the L2 cache 206 may be stored in two locations in the L1D cache 202. Thus, when determining which of the two locations in the L1D cache 202 to store a data value from the L2 cache 206, the LRU ranking of the two locations is compared. Data in the location that is least-recently accessed is evicted to make room for the data value from the L2 cache 206. Other types of caches also may be used, such as direct-mapped caches and fully-associative caches. A direct-mapped cache comprises a single line frame per set within which data from a lower-level memory location may be held. A fully-associative cache enables the storage of a lower-level memory location into any line frame of the fully-associative cache.

Figure 4:
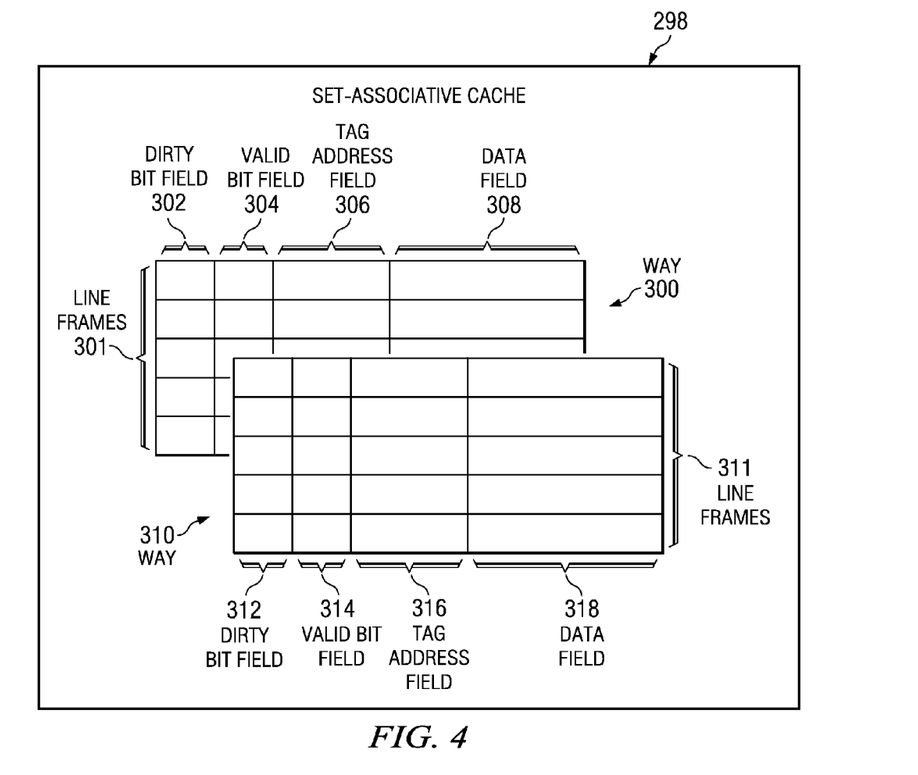
FIG. 4 shows a cache architecture associated with one or more caches in the system of FIG. 1, in accordance with embodiments of the invention.

FIG. 4 shows a detailed view of a set-associative cache 298. The cache 298 is illustrative of a first-level cache (e.g., L1D cache 202, L1P cache 204), but the cache 298 also may be representative of the L2 cache 206. The cache 298 comprises ways 300 and 310. Way 300 comprises line frames 301, and way 310 comprises line frames 311. Although ways 300 and 310 are shown comprising line frames, alternate representations may show sets comprising line frames. Each line frame 301 comprises a dirty bit field 302, a valid bit field 304, a tag address field 306, and a data field (i.e., "line") 308. Likewise, each of the line frames 311 comprises a dirty bit field 312, a valid bit field 314, a tag address field 316, and a data field (i.e., "line") 318. In operation, the DSP core 200 searches the cache 298 to locate a line having a target address. The core 200 first locates a set in the cache which matches bits 13:5 (i.e., the set address) of the target address. When a matching set is found in the cache 298, the core 200 further locates a line frame in the matching set having a tag address field which matches bits 31:14 (i.e., the tag address) of the target address. If a matching line frame is found, the core 200 then determines whether the line (i.e., the data) in the line frame is valid by checking the valid bit field of the matching line frame. If the valid bit field indicates that the line in that line frame is valid, the core 200 accesses the data and uses it as necessary.

If a matching line frame is not found in the cache 298, the core 200 allocates space in the cache 298 to bring the requested line into the cache from a lower-level cache or memory. To allocate space in the cache 298, the LRU rankings are checked to determine which line frame is least recently used, and this line frame is evicted. However, before the line frame is evicted, its dirty bit is checked to determine whether a lower level of memory/cache contains its data. If the line frame is dirty, meaning that a lower level memory/cache does not contain its data, the data in the line frame is first transferred to a lower-level memory/cache, and then is evicted from the cache 298 to allocate space.

For example, assume the core 200 needs to retrieve the data at address "0000 0020h" as quickly as possible. The core 200 first checks the cache 298 to determine whether data having the address "0000 0020h" is stored in the cache. When expanded, the address "0000 0020h" becomes:

| 000000000000000000 | 000000001 | 00000 |
|---|---|---|

As previously mentioned, in some embodiments, the 18 most significant bits constitute the tag address, the next 9 bits constitute the set address, and the last 5 bits constitute an offset or NULL value. Accordingly, the core 200 searches the cache 298 to locate a set having a set address which matches the set address "000000001." When a matching set is found, the core 200 then searches the set to locate a line frame storing a tag address which matches the tag address "000000000000000000." If a matching line frame is found and the valid bit field of that line frame indicates that the data in the line frame is valid, the core 200 extracts the data from the data field 306 in that line frame and uses it as necessary.

The scope of this disclosure is not limited to the use of a DSP 112 and, instead, other types of processors, such as multi-core DSPs, also may be used. Further, although only one DSP 112 is shown on the target hardware 104, in some embodiments, multiple DSPs (some of which may be multi-core DSPs) may be used. In preferred embodiments, the target hardware 104 is included in a mobile device 129, such as a mobile phone, a personal digital assistant (e.g., a BLACK-BERRY® device), etc. The host computer 102 is now described.

Referring again to FIG. 1, the host computer 102 comprises a processing unit 120 (interchangeably termed "CPU," "processor" and/or "control logic"), a storage 122 (e.g., memory such as RAM), an EMU controller 118 and an EMU interface 116. The CPU 120 may couple to any of a variety of input devices 126, such as a keyboard, mouse, audio input device, touchpad, etc. The CPU 120 also couples to various output devices 124, such as a display, a printer, a storage device (e.g., a hard drive), etc. The CPU 120 further couples to a network port 127 which enables the host computer 102 to communicate and exchange data with other computers on a network, such as a wireless network. The storage 122 stores one or more testing/debugging application(s) 132 which, when executed by the CPU 120, help to test and debug the software application 130. The testing/debugging application(s) 132 may be provided to the host computer 102 in the form of software code delivered using one or more information carrier media. For example, the code may be stored on a compact disc, a flash drive, a floppy disk, etc., or may be provided by way of an Internet download (e.g., from a Website or file transfer protocol (FTP) server).

More specifically, when the CPU 120 executes the testing/debugging application 132, the CPU 120 sends signals to and receives signals from the target hardware 104 via the EMU controller 118 and the EMU interface 116. The EMU controller 118 drives and controls the EMU 110 via the EMU interface 116, which in turn facilitates communications between the host computer 102 and the target hardware 104. Signals transferred from the computer 102 to the target hardware 104 generally comprise test and debug signals, and signals transferred from the target hardware 104 to the computer 102 generally comprise response signals. In this way, the software application 130 embedded on the target hardware 104 is tested and debugged using the application 132.

As described further below, when the software application 130 is executed by the DSP 112, various data values in the caches 202, 204 and 206 and the storage 114 may be modified. In some cases, addresses in the caches 202, 204, 206 and/or the storage 114 may overlap. That is, data having the same address may be located in multiple caches and/or in the storage 114. In some such cases, the caches and/or the storage 114 may become incoherent, meaning that two or more caches or the storage 114 contain different data values corresponding to a single address. For instance, the cache 202 may contain a first data value corresponding to an address "0000 0020h," and the cache 206 may contain a second data value corresponding to the address "0000 0020h," where the first and second data values do not match.

Although in many cases such incoherence is a natural result of cache updates, in some cases, such incoherence may be caused by bugs or defects in the software application 130.

Thus, when a software developer uses the testing/debugging application 132 on the host computer 102 to debug the software application 130, information pertaining to the caches preferably is transferred from the target hardware 104 to the host computer 102. The host computer 102 then uses the application 132 to process the received information and to provide the information in accordance with various embodiments of the invention as described below. In this way, a software developer using the application 132 on the host computer 102 is provided with information useful in testing and/or debugging the application 130. The information may be provided to the developer via a visual display, a printout, a network connection, etc. The information also may be stored directly to a storage device (e.g., a hard drive, a floppy disk, a compact disc, a flash drive) associated with the host computer 102 and/or may be transferred to another computer in communications with the host computer 102. The scope of disclosure is not limited to providing the information in any particular manner or via any specific medium.

In some embodiments, information associated with each line frame of each cache on the target hardware 104 is collected by the core 200 and is provided to the host computer 102. Information provided for each line frame may comprise data stored in that line frame, the type of cache within which the line frame is contained (e.g., L1P, L1D, L2, etc.), whether the data (i.e., line) in the line frame is valid, whether the data is dirty, the set within which the line frame is contained, the way within which the line frame is contained, the tag address associated with the line, whether the line is least-recently used, a size of the line frame, etc. Such information is obtained from the dirty bit field, valid bit field, tag address field, data field, etc. associated with each cache line as shown in FIG. 4.

The information collected by the core 200 may indicate which lines are included in each cache, the level and type of cache in which each line is stored, the level and type of cache storing any dirty lines, which lines are dirty, which lines are valid, the cache level/type storing each line that is valid, etc. The scope of disclosure is not limited to these data, and other types of information may be provided as desired. For example, the LRU ranking of each line may be provided, as well as information indicating the cache level, cache type and way with which the line is associated. In embodiments with multiple cores, valid and dirty cache line information from across most or all cores and cache levels/types may be transferred from the target hardware 104 to the host computer 102.

The scope of disclosure still is not limited to the examples provided above. Additional information may be collected by the core 200 for transfer to the host computer 102, such as information regarding the memory architecture of the target hardware 104 and, more specifically, the DSP 112. For instance, the target hardware 104 may provide information to the host computer 102 indicating that the target hardware 104 comprises a storage 114, an L2 cache 206, an L1P cache 204 and an L1D cache 202. In some embodiments, the information may indicate hierarchical properties of the memories. Specifically, continuing with the current example, the information may indicate that the storage 114 is the slowest of the memories, followed by the L2 cache 206 and the fastest caches, the L1P cache 204 and L1D cache 202. The information also may indicate the speeds at which the memories may be accessed. For instance, it may be indicated that the DSP 112 has a processor speed of 600 MHz, that the L1D cache 202 and the L1P cache 204 have access speeds of 600 MHz, that the L2 cache 206 has an access speed of 300 MHz, and that the storage 114 has an access speed of about 100 MHz. In at least some embodiments, because memories may be reconfigured at run-time (e.g., by an end-user), the information regarding memory hierarchy preferably is not static and is provided to the host computer 102 on a regular basis (e.g., by the memory system itself).

Still other information may be collected by the core 200 for transfer to the host computer 102. In some embodiments, the information may indicate, for each address associated with a line in the caches and memories of the target hardware 104, the set to which the address maps, as well as which lines are stored in each way of that set. The information also may include the addresses associated with the lines stored in each way of that set. Thus, for example, for an address "0000 0020h," the information may indicate the set to which the address maps, as well as the lines (and associated addresses) stored in that set. In some embodiments, such set and way information is obtained for each address associated with a line in the caches and memories of the target hardware 104. In other embodiments, such set and way information is obtained for a predetermined group of addresses, such as those requested by a user of the testing/debugging application 132. The information also may indicate which addresses belong to each set and whether any addressing conflicts are present in any of the caches.

Developers may use high-level programming languages (e.g., C/C++) in developing software applications such as software application 130. As such, the developers may create and use variables having variable names to store data. Each variable corresponds to an address of the memories on the target hardware 104. Developers generally are more familiar with variable names rather than specific addresses that correspond to the variable names. Accordingly, at least part of the information provided to the host computer 102 by the target hardware 104 includes symbol information associated with at least some of the addresses of the caches 202, 204, 206 and the storage 114. For example, if a data structure or function at the address range "0x00800000-0x00800200" is associated with a variable called "VAR1," the information sent from the target hardware 104 to the host computer 102 associates variable name VAR1 with this address range. The name then may be displayed to the developer with each cache line associated with the address range. In some embodiments, the start address of a data structure VAR1 is annotated with "Start" or another similar term, and the end address of the data structure VAR1 is annotated with "End" or another similar term. Cache lines falling within the structure are displayed with the name VAR1 and the offset in number of lines from the start address, so the position of the line within the data structure VAR1 is displayed. An illustrative example of such an information display may include:

| |
|---|
| 0x00800000 VAR1 (Start) |
| 0x00800040 VAR1 +1 line |
| .... |
| 0x00800200 VAR1 +4 lines (End) |

The scope of disclosure is not limited to displaying addresses associated with variable names. The host computer 102 may associate an address with any suitable label, variable name, or other alphanumeric or graphical symbol and subsequently displayed in association with the address or range of addresses.

This information may be used for a variety of purposes. For example, the tag address may be used to determine to which address a particular line maps. The valid bit information or the cache level/type information may be used to determine data access time and to verify whether a particular data structure is stored in a particular cache or not. If new data is to be stored into a particular cache, the LRU information may be used to determine which line would be evicted next from that cache. Set and way information may be used to determine the organization of lines in caches.

The information associated with the line frames of each cache is transferred from the target hardware 104 to the host computer 102 via the JTAG port 128, the cable 108, and the pod 106. The information may be transferred serially or in parallel, as desired. Further, the information may be transferred at predetermined intervals, regular intervals, irregular intervals, and/or otherwise as desired.

In some embodiments, the host computer 102 may send a signal to the target hardware 104 which initiates information transfer, in which case the host computer 102 may be programmed to retrieve information at predetermined intervals. In other embodiments, the target hardware 104 may send a signal to the host computer 102 which initiates the information transfer, in which case the target hardware 104 may be programmed to transfer information at predetermined intervals. In some embodiments, the core 200 collects information from the caches/memories associated with the DSP 112 and prepares the information for transfer to the host computer 102. In embodiments with multiple cores in the target hardware 104, each core may collect information from its respective caches and memories and may prepare the information for transfer to the host computer 102. The cores may be in communications with each other to schedule transfer of each core's information to the host computer 102. The transfer of information from the target hardware 104 to the host computer 102 is not limited to any particular technique. Once received by the host computer 102, the information is processed as is now described.

The host computer 102 processes and manipulates information received from the target hardware 104 so as to enable an end-user of the host computer 102 to visualize most or all of the contents and states (i.e., statuses) of the various caches and memories of the target hardware 104 and to debug the software application 130 accordingly. For example, the host computer 102 may analyze similarities and differences between the caches to detect data corruption problems, etc. Set forth below is an illustrative process whereby the host computer 102 manipulates information received from the target hardware 104. In preferred embodiments, the manipulated information is then displayed to an end-user by way of an interactive graphical user interface. The scope of disclosure is not limited to the following process, and the various steps of the following process may be performed in any suitable order.

When received from the target hardware 104, the data is "pre-processed" by the CPU 120. Pre-processing comprises filtering through the received data to extract the data which is to be displayed to an end-user and discarding the received data which is not to be used. Pre-processing also comprises manipulating the filtered data in various ways to organize information for presentation to an end-user of the testing/debugging application 132. Because the data which is retained and the data which is discarded generally depends on user preferences specified using the testing/debugging application 132, there may be considerable variation in the pre-processing step.

In some embodiments, during the pre-processing step, the CPU 120 determines differences that may exist between data in different cache/memory locations associated with a single address. For example, the CPU 120 may determine whether data stored at "0000 0020h" in storage 114 differs from the data stored at "0000 0020h" in the L2 cache 206. Likewise, the CPU 120 may determine whether data stored at "0000 0020h" in storage 114 differs from the data stored at "0000 0020h" in the L1D cache 202. In some embodiments, the single address may be provided by a user. In other embodiments, the single address may be predetermined and may be provided to the user via a display. Other such determinations also may be made not only for the address "0000 0020h," and not only for the storage 114, L2 cache 206, and L1D cache 202, but for any suitable address in any suitable memory, cache or other type of storage (e.g., a unified cache, described further below). Further, such determinations of differences may be made between any number of memory, cache or other storage locations. In some embodiments, such determinations may be made along a split cache path. Specifically, differences may be determined between caches/memories in the instruction flow path (e.g., the L1P cache 204, L2 cache 206, storage 114) and, likewise, differences also may be determined between caches/memories in the data flow path (e.g., the L1D cache 202, L2 cache 206, storage 114), or between data and instruction caches.

The above difference determinations may be made at any time, such as during memory accesses. For example, the difference determinations may be made when an external source writes data directly to physical memory (e.g., storage 114), bypassing the caches 202, 204 and 206. Likewise, the determinations may be made when the core 200 writes to a cache and the destination is an external entity reading directly from physical memory, bypassing the caches 202, 204 and 206. Similarly, the determinations may be made when the source is the data path and the destination is the instruction path, with each path having a separate cache (e.g., the L1D cache 202 and the L1P cache 204). The sources and destinations provided above do not limit the scope of disclosure. Instead, the source and/or destination may be any suitable entity, such as an external system, a direct memory access (DMA) controller, a core different than the core 200, a co-processor, or a peripheral device. In preferred embodiments, the host computer 102 determines the differences by first halting the target hardware 104, retrieving the cache information from the target hardware 104, and then determining the differences on the host computer 102.

Figure 5A:
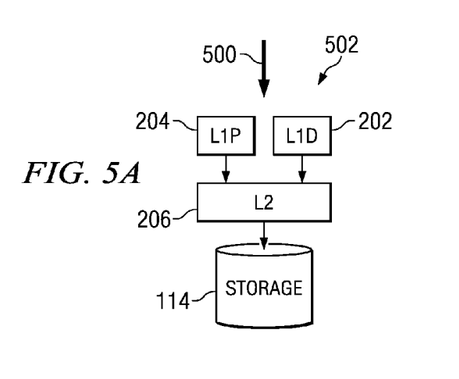
FIG. 5A shows a view of a memory hierarchy stored in the digital signal processor of FIG. 2.
Figure 5B:
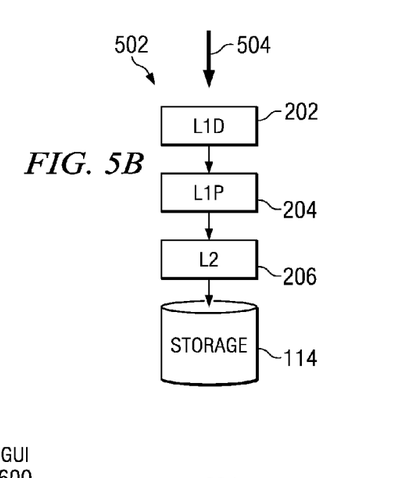
FIG. 5B shows a unified first-hit view of the memory hierarchy shown in FIG. 5A, in accordance with embodiments of the invention.

As previously mentioned, the storage 114, the L2 cache 206, the L1P cache 204 and the L1D cache 202 are included in a hierarchical memory system. The L1D cache 202 and the L1P cache 204 are on a common level in this hierarchy, since the L1D cache corresponds to the data path and the L1P cache corresponds to the instruction fetch path. In other debugging applications, a hierarchical memory system such as that shown in FIG. 2 is represented using a "first-hit view." A first-hit view is represented graphically in FIG. 5A. The arrow 500 represents a first-hit view of the hierarchical memory system 502 comprising caches 202, 204, 206 and the storage 114 as would be displayed to an end-user of the testing/debugging application 132. Data stored in addresses common to multiple caches are only displayed in the highest-level cache in which the addresses are found. For example, if caches 202 and 206 contain address "0000 0020h," only the contents of address "0000 0020h" in cache 202 will be displayed. However, because the system 502 has two different paths (i.e., an instruction path and a data path), two different views (one for each path) may be needed. Accordingly, during the pre-processing step and in at least some embodiments of the invention, the core 200 assigns priority levels to caches or other memory system components which are on a common level so that, when displayed, the caches/memory system components on the common level appear to be on different levels. Such assignment of priority may be performed per a user specification and may be performed by adjusting priority bits (not specifically shown) associated with the caches having the common level. Continuing with the current example and as shown in FIG. 5B, the L1D cache 202 is assigned a higher priority level than the L1P cache 204, thereby providing the core 200 with a "unified first-hit view." As shown in FIG. 5B, the L1D cache 202 has the highest priority level, followed by the L1P cache 204, followed by the L2 cache 206, followed by the storage 114. In this way, cache levels which are actually on a common level appear to the core 200 to be on separate levels. Accordingly, separate views for separate paths (i.e., the instruction fetch path and the data path) may not be necessary.

In some embodiments, the CPU 120 may use the information provided by the target hardware 104 to bypass one or more levels of memory, thus enabling an end-user of the testing-debugging application 132 to visualize previously hidden portions of levels below the bypassed level. For example, referring to FIG. 5B, assume both the L1D cache 202 and the L1P cache 204 comprise data associated with an address "0000 0020h." An end-user of the application 132 may only see the data at "0000 0020h" as stored in the L1D cache 202, since a first-hit view is provided as indicated by arrow 504. The data at "0000 0020h" as stored in the L1P cache 204 may be hidden by the data at "0000 0020h" as stored in the L1D cache 202. However, in accordance with embodiments of the invention, the CPU 120 may bypass some or all of the L1D cache 202. Thus, in this example, the data at "0000 0020h" as stored in the L1D cache 202 may be bypassed, thereby revealing the data at "0000 0020h" as stored in the L1P cache 204. Alternatively, the entire L1D cache 202 may be bypassed, thereby revealing not only the data at "0000 0020h" as stored in the L1P cache 204, but also revealing most or all information stored in the L1P cache 204 and/or other lower level caches/memory. The scope of disclosure is not limited to bypassing any particular caches or memory system components. For example, any of the caches 202, 204, 206 or the storage 114 may be bypassed, either individually or in combination with at least one other cache or storage. Likewise, individual cache lines, cache state information, etc. also may be bypassed as desired.

The CPU 120 bypasses a level by not displaying data associated with that level to the end-user of the testing/debugging application 132. Because data associated with the bypassed level is not displayed, most or all of the data associated with the next level is displayed. Likewise, the CPU 120 may bypass a portion of a level by not displaying data associated with that portion of the level. The bypassing functionality is not limited to bypassing levels or portions of levels. An end-user of the testing/debugging application 132 may set preferences that cause the CPU 120 to bypass specific cache types, to bypass specific information (e.g., cache data, dirty bits, valid bits) for any cache level or type, etc.

In some embodiments, the CPU 120 receives information from the target hardware 104, extracts desired information (e.g., as indicated by an end-user of the testing/debugging application 132), and combines information from different memory/cache levels. For instance, an end-user of the application 132 may specify that the user desires to see only dirty lines in caches L1D 202 and L1P 204. Accordingly, the CPU 120 may extract the dirty line information associated with L1D 202 and L1P 204 from the information received from the target hardware 104. The CPU 120 may combine the dirty line information across various cache and memory levels, and may display the resulting combination to the end-user. Similarly, in embodiments where the DSP 112 is a multi-core processor, the CPU 120 may extract desired information from the received information, and may combine information from caches/memories across multiple cores.

In some embodiments, cache information is grouped by ways before it is displayed to an end-user of the testing/debugging application 132. However, in some cases, information associated with a single address range may be divided among multiple different ways. When a single address range is divided among different ways, cache information may be difficult for the end-user to interpret. Accordingly, in some embodiments, the CPU 120 may re-assign lines having contiguous addresses to a single cache way (e.g., specified by a user). For example, if information in an address range "0000 0020h-0000 0060h" is divided among different ways, the CPU 120 may re-assign the information in the address range "0000 0020h-0000 0060h" to a common way so that the cache information may be more easily interpreted by the end-user. Re-assignment of a line to a different way may entail the adjustment of one or more bits in the cache containing the line, where the bits that are adjusted determine the way to which the line belongs. Once the line is re-assigned to a different way, content and/or status information may be extracted from the line and provided to the host computer 102 for processing and display.

The scope of disclosure is not limited to these pre-processing steps. Instead, various pre-processing steps may be performed to manipulate data received from the target hardware 104 as desired. Further, in each of the pre-processing techniques described above, redundant information received from the caches may be discarded so as to prevent the end-user from being provided with extraneous information.

After the information received from the target hardware 104 is pre-processed, the information may be post-processed to prepare the information to be displayed by way of an interactive graphical user interface. Post-processing may comprise arranging information in an intuitive, "user-friendly" manner. For example, post-processing may comprise hiding, merging, overlaying, multiplexing and/or "marking up" (e.g., highlighting) display information as desired.

In some embodiments, information from different memories and caches may be merged and represented with a single mark-up style. For example, upon a request by the end-user of the application 132 to display dirty lines in any cache, the CPU 120 may merge dirty lines in L1D cache 202, L2 cache 206, etc. into a single graphical display which is shown to the end-user. The dirty lines may be marked-up in a suitable fashion, for example using a bold font, an underline font, an italicized font, highlighting, etc.

In some embodiments, various cache and memory information may be overlaid using distinct mark-up styles. For instance, data contents of a cache may be displayed using text, the level of the cache storing the data may be indicated using a distinct background color associated with the cache, and the state of the data contents may be indicated as "dirty" using a bold font. Any suitable text font, background color, etc. may be used. It should be recognized that there are various techniques by which information may be marked-up, and that the scope of disclosure is not limited to any particular mark-up technique.

In some embodiments, a common mark-up technique may be used for information types which are not simultaneously displayed. For instance, because information pertaining to dirty lines and information pertaining to LRU ranks might not be simultaneously displayed, each of these information types may be represented using a bold font, or some other common mark-up technique. An end-user of the testing/debugging application 132 may use a feature in the application 132, such as a clickable icon, to toggle between different information types which share a common mark-up technique.

The post-processing step also may comprise sorting the pre-processed data in accordance with user preferences indicated by an end-user of the testing/debugging application 132. In some embodiments, the CPU 120 may sort the data by core (i.e., when using a multi-core DSP 112). If the data is to be sorted by core, the end-user may desire to see cache information in a top-down fashion, first by core, then by the level and type of cache. The end-user is more likely to be interested in what address ranges are in cache and less interested in which sets or ways the data is stored. Accordingly, the CPU 120 may sort the information first by core, then by level and type of cache, by address, by set, and then by way. The scope of disclosure is not limited to sorting cache information in this order.

In some embodiments, the CPU 120 may sort the information by address. If the data is to be sorted by address, the user may be interested in determining whether a particular address is cached in multiple cores (e.g., in a multi-core DSP 112). Accordingly, the information is sorted first by address, then by core, by level and type of cache, by set, and then by way. The scope of disclosure is not limited to sorting cache information in this order.

In some embodiments, the CPU 120 may sort the information by the level and type of cache. In such cases, the user may want caches of the same level and type to be grouped together, regardless of core. Accordingly, the CPU 120 sorts the information first by cache level and type, followed by core, by address, by set, and then by way. The scope of disclosure is not limited to sorting cache information in this order.

In some embodiments, the CPU 120 may sort the information by set. In such cases, the user may be interested in determining the layout of a particular cache (e.g., to determine the presence of any conflicting lines). Accordingly, the CPU 120 sorts the information first by core, level and type of cache, set, and then by way. The scope of disclosure is not limited to sorting cache information in this order.

In some embodiments, the CPU 120 may sort information by way. In such cases, the user may be interested in determining the layout of a particular cache, one cache way at a time. Accordingly, the CPU 120 sorts the information first by core, by cache level and type, by way, and then by set. The scope of disclosure is not limited to sorting cache information in this order.

In some embodiments, the CPU 120 may sort information by validity of lines. Specifically, the CPU 120 sorts the information first by validity, then by address, by core, by cache level and type, by set, and then by way. In other embodiments, the CPU 120 may sort information based on dirtiness of lines. In such cases, the user may desire to visualize the dirty lines grouped together, regardless of cache. Accordingly, the CPU 120 sorts the information first by dirtiness, by address, by core, by cache level and type, by set, and then by way. The scope of disclosure is not limited to sorting cache information in these orders.

The post-processing step also enables an end-user to filter cache and memory information so that only desired information is displayed. The CPU 120 may filter any information as specified by the end-user. For example, in some embodiments, the CPU 120 may filter the information so that invalid cache lines are not displayed to the end-user. In other embodiments, the CPU 120 may filter the information so that only dirty cache lines are displayed to the end-user. In still other embodiments, the CPU 120 may filter the information so that cache lines which do not fall within an address range specified by the end-user are not displayed to the end-user. Likewise, the CPU 120 may filter information according to core, tag address, cache level and/or type, set, way, validity, dirtiness, LRU ranking, or any other suitable filtering criteria as requested by the end-user. In filtering information, a filtering criterion received from the user is used to determine which information should and should not be displayed to the user. In some embodiments, information meeting the filtering criterion is displayed to the user. In other embodiments, information meeting the filtering criterion is not displayed to the user. The scope of disclosure is not limited to these filtering criteria.

After information transferred from the target hardware 104 to the host computer 102 has been pre-processed and post-processed, the information is displayed to an end-user of the testing/debugging application 132. The information may be displayed on a display, shown in FIG. 1 as an output device 124. The information preferably is presented in the form of a graphical user interface (GUI) with which the end-user may interact to visualize most or all of the cache/memory information and states.

There may be considerable variation in the format of the GUI with which the information is presented to the end-user of the testing/debugging application 132. By way of the GUI, the application 132 enables the user to manipulate data received from the target hardware 104 as described above such that the GUI displays most or all cache contents and state information. The application 132 may then be used to manipulate the information (e.g., to filter, re-arrange, mark-up, display/hide) as desired.

Figure 6:
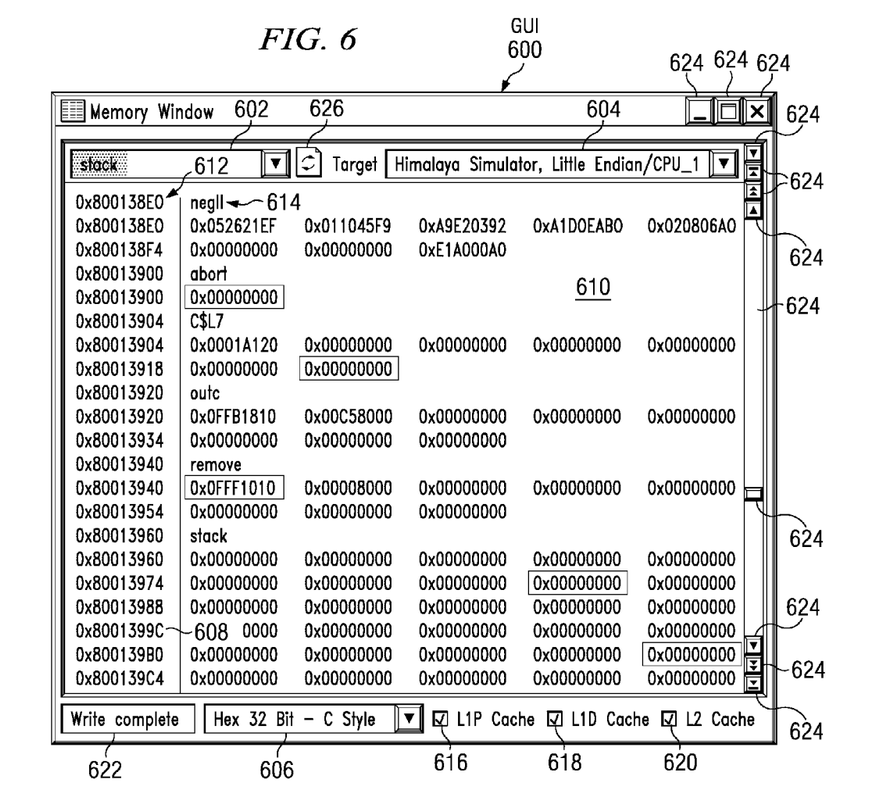
FIG. 6 shows an illustrative graphical user interface (GUI) having a content-based view of the memory hierarchy of FIG. 5A, in accordance with embodiments of the invention.

The GUI provides the end-user with different views into the memory hierarchy of the DSP 112. In some embodiments, contents and/or states associated with each cache having a common address may be simultaneously displayed. Likewise, contents and/or state associated with caches (i.e., having a common address) in multiple cores also may be simultaneously displayed. In some embodiments, the GUI provides the end-user with a view of cache information projected onto physical memory information. In this view, a memory map of the contents of the storage 114 and the caches 202, 204 and 206 is provided, with additional memory and cache state information (e.g., valid, dirty, LRU) for each cache line. Such a view may be a first-hit view of the memory hierarchy of the DSP 112. An illustrative example of this type of view is shown in FIG. 6. FIG. 6 shows a GUI 600 as displayed on an output device 124. The illustrative GUI 600 displays various instruction opcodes and stack contents, although the scope of disclosure is not limited as such. The GUI 600 comprises drop-down menus 602, 604 and 606. The drop-down menu 602 allows the user to enter a start address; the drop-down menu 604 displays a list of available processors for which memory/cache may be displayed; and the drop-down menu 606 displays a notation style of information contained in frames 608 and 610. The frame 608 which provides a list of various addresses associated with the memory hierarchy of the DSP 112. Frame 610 shows data, status information, etc. associated with the memory hierarchy of the DSP 112. Each line of frame 608 cross-references with the adjacent line of frame 610. Thus, for example, line 612 of frame 608 is associated with line 614 of frame 610. The GUI 600 also comprises multiple checkboxes 616, 618 and 620, which correspond to the L1P cache 204, the L1D cache 202 and the L2 cache 206, respectively. Toggling the checkbox 616 causes information associated with the L1P cache 204 to appear or disappear (be bypassed) from the GUI 600. Likewise, toggling the checkboxes 618 and 620 causes information associated with the L1D cache 202 and the L2 cache 206, respectively, to appear or disappear (be bypassed) from the GUI 600. Window 622 comprises a status window which indicates a status of the testing/debugging application 132. The GUI 600 also comprises GUI adjustment features 624 which adjust the size of the GUI 600, scroll the GUI 600, etc. Actuation of the refresh button 626 may refresh the information displayed in the GUI 600.

A bypassed first-hit view also is within the scope of disclosure. In the bypassed first-hit view, one or more cache/memory levels is bypassed, and a first-hit view of any remaining levels is provided. For example, referring to FIG. 5A, a first hit view of the caches of the DSP 112 may show L1D cache 202 and L1P cache 204 as having a priority higher than that of L2 cache 206, and the L2 cache 206 as having a priority higher than that of the storage 114. However, if the L1D cache 202 and the L1P cache 204 are bypassed, a bypassed first-hit view would display the L2 cache 206 as having highest priority. In this way, the contents and states of different cache levels may be displayed using a first-hit view.

Figure 7:
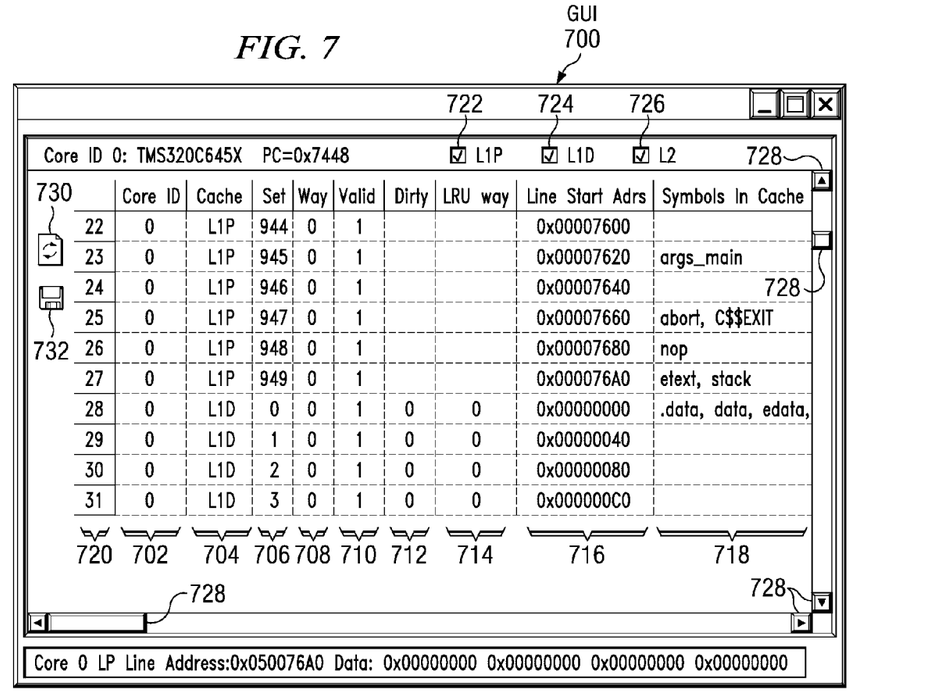
FIG. 7 shows an illustrative GUI having a tabular view of the memory hierarchy of FIG. 5A, in accordance with embodiments of the invention.

In some embodiments, the GUI provides a detailed view into individual caches. This view provides a complete or nearly complete view of the contents of each cache and state information associated with each cache line. An illustrative example of this view is shown in the GUI 700 of FIG. 7. As shown, the GUI 700 comprises a plurality of rows and columns. For each row, column 702 describes the core with which the row is associated. Column 704 describes the cache, column 706 describes the set, column 708 describes the way, column 710 describes the valid bits, column 712 describes the dirty bits, column 714 describes the LRU, column 716 describes an address, and column 718 describes symbols associated with the row. Column 720 numbers each of the rows, although the number associated with each row preferably is for the purposes of display and does not imply anything about the data or status associated with the row. GUI 700 also comprises checkboxes 722, 724 and 726 which are similar in function to the checkboxes 616, 618 and 620 of FIG. 6. GUI 700 further comprises GUI adjustment features 728 which are similar in function to GUI adjustment features 624 of GUI 600. GUI 700 also comprises a refresh button 730 similar to refresh button 626 of GUI 600, and further comprises a save button 732 which may be used to save the information displayed via the GUI 700 (e.g., to a suitable storage on the host computer 102). The save button 732 also may be used to capture "snapshots" of the information displayed via the GUI 700 (e.g., at relevant points during execution of the application 130 or during single-step execution of the application 130). Information saved using the save button 732 may be retrieved for later viewing.

Figure 8:
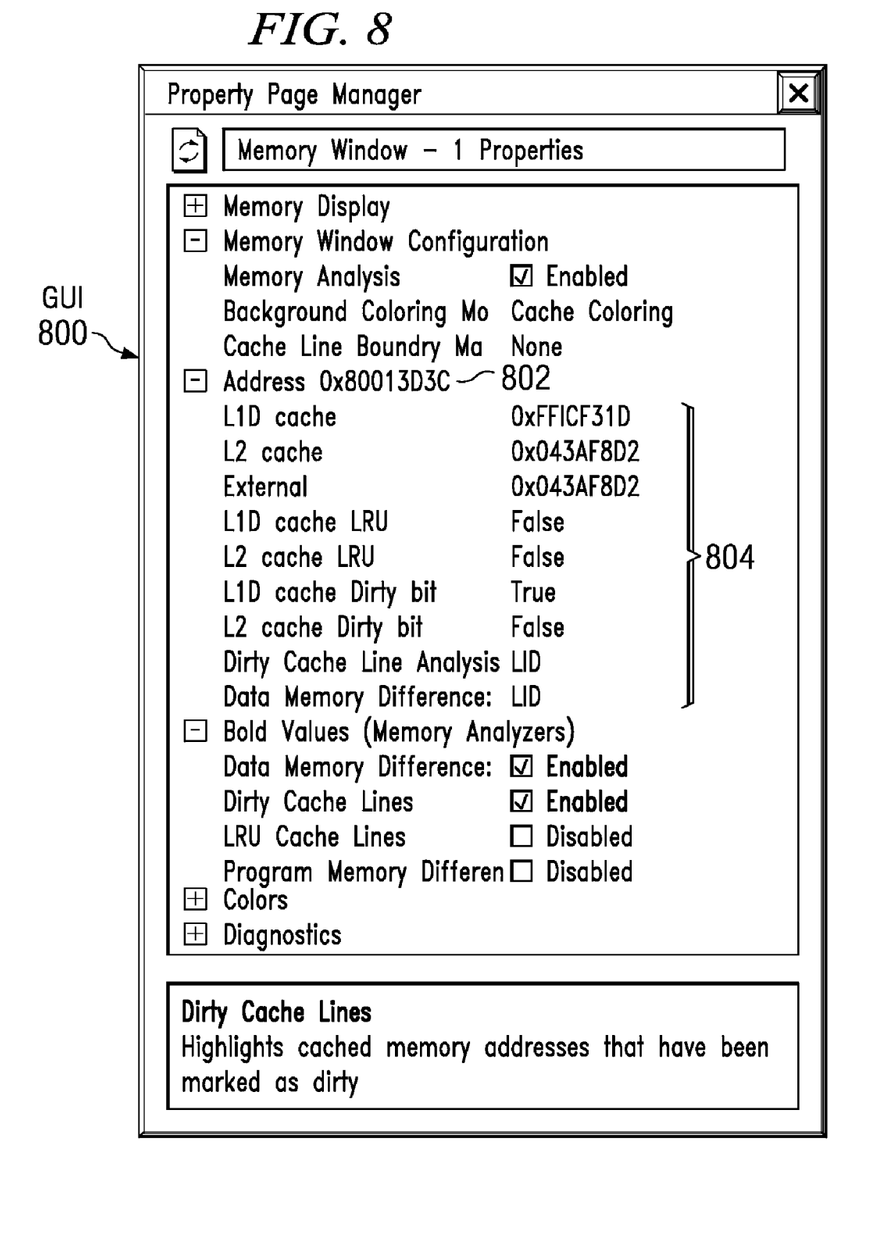
FIG. 8 shows an illustrative GUI having a single-address view of the memory hierarchy of FIG. 5A, in accordance with embodiments of the invention.

In some embodiments, the GUI provides a view into a single address. This view displays most or all data contents and states associated with an address found in memories and/or caches. An illustrative example of such a view is shown in the GUI 800 of FIG. 8. The GUI 800 provides various information to an end-user of the testing/debugging application 132, all of which is not discussed herein. However, in particular, the GUI 800 comprises an address field 802 which specifies a particular address and an information field 804 which specifies the contents and status information of various memories and caches associated with the address in address field 802. For example, as shown in the figure, address "0x80013D3C" is shown in the address field 802. The information field 804 comprises information pertaining to address "0x80013D3C." In particular, the L1D cache 202 is shown to contain "0xFF1CF31D" at address "0x80013D3C," the L2 cache 206 contains "0x043AF8D2" at address "0x80013D3C," and the external memory (e.g., storage) contains "0x043AF8D2" at address "0x80013D3C." Thus, at this address, the L2 cache 206 is consistent with the external memory, but the L1D cache 202 is not. Accordingly, the "data memory difference" field indicates that L1D cache 202 is inconsistent with the external memory. The address "0x80013D3C" is not associated with the least recently used cache line in the L1D cache 202, nor is it associated with the least recently used cache line in the L2 cache 206. The cache line in the L1D cache 202 associated with "0x80013D3C" is dirty, as is the cache line in the L2 cache 206 associated with "0x80013D3C." Additional information may be provided with the GUI 800 as desired.

Figure 9:
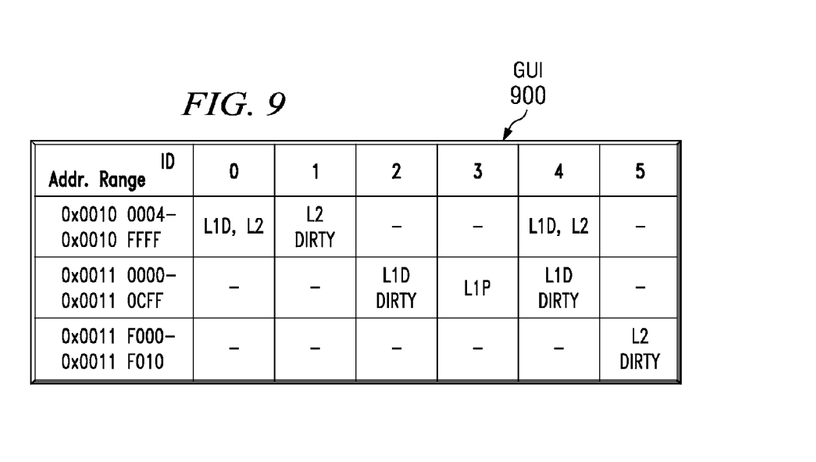
FIG. 9 shows an illustrative GUI having a summary-view of the memory hierarchy of FIG. 5A, in accordance with embodiments of the invention.

In some embodiments, the GUI provides a summary view of caches states across most or all caches and across most or all cores in a multi-core system. An illustrative example of this view is provided with the GUI 900 of FIG. 9. As shown, the GUI 900 cross-references each processor core, an address range of memory associated with the core, and the caches in which data corresponding to the address range may be found. For example, the address range "0x0010 0000-0x0010 FFFF" associated with core 0 is found in both the L1D cache 202 and the L2 cache 206. Likewise, the address range "0x0010 0000-0x0010 FFFF" associated with core 1 is found in the L2 cache 206, and the data is dirty. Similarly, the address range "0x0011 0000-0x0011 0CFF" associated with core 2 is found in the L1D cache 202, and the data is dirty. In this fashion, the caching and status of each of the address ranges of each core is indicated via the GUI 900.

The information shown in FIGS. 6-9 may be sorted as desired (e.g., as specified by a user). For example, in some embodiments, the information may be sorted by core, by cache level, by cache, by dirtiness or validity, by address range, or by any other suitable criterion. The testing/debugging application 132 may comprise a toggle button or other visual representation by which a user of the application 132 may adjust sorting criteria. An end-user of the testing/debugging application 132 may use the information shown in FIG. 9 to verify that no old virtual addresses (e.g., a memory location as it appears in software code) are left in a cache before performing a page swap. The display of FIG. 9 also may be used for multi-core cache coherence debugging, whereby valid and dirty cache line information is summarized across multiple cores, and whereby the information is optionally sorted according to a user-specified criterion. The information in FIG. 9 also may be used to verify that no old virtual addresses are left dirty in a cache before performing a page swap. If a virtual address is found in a cache, the cache line associated with the virtual address is removed prior to performing the page swap.

In some embodiments, the information displayed on an output device 124 may be updated on a real-time basis. As information is transferred from the core(s) of the target hardware 104 to the test computer 102, the information is pre-processed, post-processed and subsequently displayed on an output device 124. In other embodiments, the information displayed on the output device 124 may be updated on a predetermined interval. In some such embodiments, the testing/debugging application 132 may comprise an adjustable feature whereby an end-user of the application 132 may adjust the predetermined interval at which the information is updated. In some embodiments, the information is updated when the core halts (e.g., due to a breakpoint when single-stepping through software code).

An end-user of the testing/debugging application 132 may use the application 132 to manipulate the contents and/or state information of the memory hierarchy of the target hardware 104. For example, in some embodiments, the application 132 may be used to adjust LRU rankings of different cache lines, to adjust valid and/or dirty bits of different cache lines, to overwrite data in cache lines with new data, to adjust tag addresses associated with cache lines, to adjust set addresses associated with cache lines, to adjust the sets or ways to which cache lines are assigned, and/or to initiate cache writebacks. Further, each memory/cache may be written to directly using the application 132 without writing to other caches as well. For example, although the L1D cache 202 ranks higher in the memory hierarchy than the L2 cache 206, an end-user of the application 132 may write data directly to the L2 cache 206 without first writing the data to the higher-priority L1D cache 202. Specifically, each write or read access to the caches is associated with a code that tells the caches/memory how to handle the data (e.g., whether to ignore the data, accept the data, pass the data on to the next level cache, etc.). The application 132 preferably generates a GUI which enables the end-user to specify what data is to be written to which memory, cache, cache line, address, etc. (generally termed a "cache identifier") on the target hardware 104. The GUI also may enable the end-user to further specify a specific address to which the data is to be written.

Figure 10:
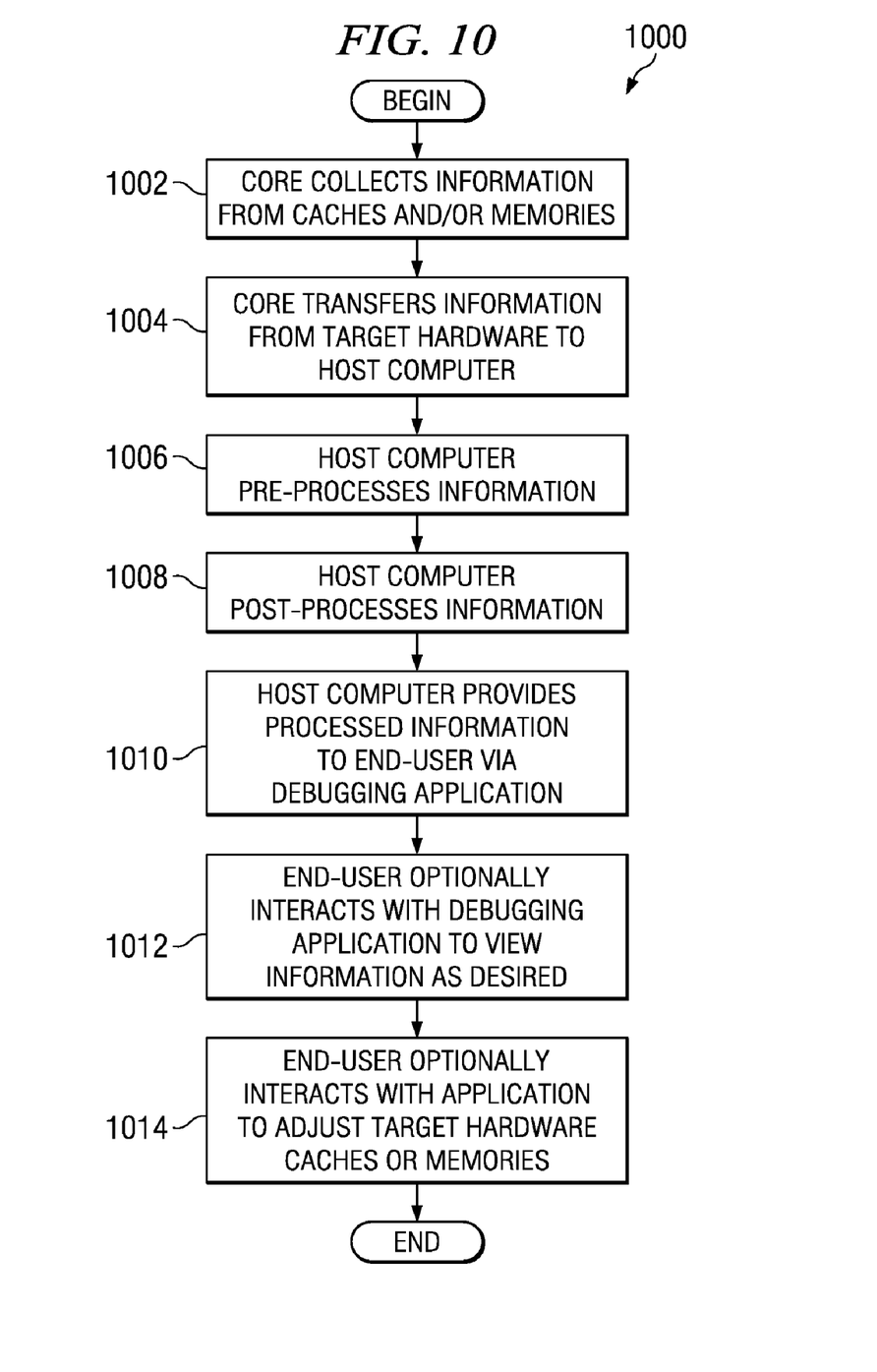
FIG. 10 shows a flow diagram of an illustrative method in accordance with embodiments of the invention.

FIG. 10 shows an illustrative method 1000 which may be implemented in accordance with embodiments of the invention. The method 1000 begins at block 1002 with collecting (e.g., using the core 200) information (e.g., data contents and state information) from caches (e.g., L1D, L1P and L2 caches) and/or memories (e.g., storage 114). In multi-core systems, multiple cores may collect information from corresponding caches and/or memories. The method 1000 continues with the core 200 transferring the collected information from the target hardware 104 to the host computer 102 (block 1004). In turn, the host computer 102 pre-processes the information (block 1006) and post-processes the information (block 1008), as described above. The method 1000 also comprises the host computer 102 providing processed information to an end-user of the testing/debugging application 132 (block 1010). As previously described, the end-user may be provided with the information in any suitable manner, such as via a GUI on a display, a printout, etc. At block 1012, the end-user may interact with the application 132 to view the information as desired (e.g., toggling filters on and off, bypassing levels, marking-up information, using different views). The method 1000 further comprises the end-user optionally interacting with the debugging application 132 to adjust one or more target hardware caches and/or memories (block 1014).

The scope of disclosure is not limited to the views described above. Other views, arrangements of information, etc. which provide visibility into most or all storage and cache components of memory hierarchy are included within the scope of disclosure. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An information carrier medium containing software that, when executed by a processor, causes the processor to:
receive information from caches on different cache levels, said caches comprising a plurality of cache line addresses, each cache line address associated with a corresponding name; and display the information on a graphical user interface (GUI), said GUI cross-referencing each of said cache line addresses with a corresponding name.

2. The information carrier medium of claim 1, wherein the software causes the processor to display a group of said cache line addresses in association with a common name.

3. The information carrier medium of claim 2, wherein said group comprises a first cache line and a second cache line separated from the first cache line by an offset, and wherein the software causes the processor to display the second cache line in association with said offset.

4. The information carrier medium of claim 1, wherein the software causes the processor to sort said information according to a sorting criterion specified by a user of the software.

5. The information carrier medium of claim 4, wherein the sorting criterion is selected from the group consisting of core information, address information, cache level information, cache type information, set information, way information, valid bit information, dirty bit information and a least-recently used ranking.

6. The information carrier medium of claim 1, wherein the software causes the processor to filter the information according to a filtering criterion specified by said user.

7. The information carrier medium of claim 6, wherein said filtering criterion is selected from the group consisting of cache dirtiness, cache validity and an address range.

8. The information carrier medium of claim 6, wherein a cache line not meeting said filtering criterion is not displayed to the user.

9. A system, comprising:
a cache subsystem configured according to a hierarchy comprising a plurality of cache levels, at least some of said cache levels comprising cache line addresses, at least some of said cache line addresses associated with a corresponding name; and
a control logic coupled to said cache subsystem, said control logic adapted to collect information from different cache levels and to provide said information to a processor;
wherein the processor displays the information on a graphical user interface (GUI), said GUI cross-referencing each of said cache line addresses with a corresponding name.

10. The system of claim 9, wherein the processor displays a group of the cache line addresses in association with a common name.

11. The system of claim 10, wherein the group comprises a first cache line and a second cache line separated from the first cache line by an offset, and wherein the processor displays the second cache line in association with said offset.

12. The system of claim 9, wherein the processor sorts said information according to a sorting criterion specified by a user.

13. The system of claim 9, wherein the processor filters the information according to a filtering criterion specified by a user.

14. The system of claim 13, wherein said filtering criterion is selected from the group consisting of cache dirty bit information, cache valid bit information and an address range.

15. A method, comprising:
collecting information from different levels of a storage system hierarchy, said levels comprising multiple entry addresses, at least some of said entry addresses associated with corresponding names;
transferring said information from the storage system to a control logic coupled to the storage system; and
displaying the information on a display coupled to the control logic, said information displayed using a graphical user interface (GUI) that cross-references each of the entry addresses with a corresponding name.

16. The method of claim 15, wherein displaying the information comprises displaying a group of entry addresses in association with a common name.

17. The method of claim 16, wherein displaying the group comprises:
displaying a first entry, a second entry separated from the first entry by an offset; and
displaying the second entry in association with said offset.

18. The method of claim 15 further comprising filtering said information according to a filtering criterion specified by a user.

19. The method of claim 15 further comprising hiding from a user a storage entry that meets said filtering criterion.

20. The method of claim 15 further comprising sorting said information according to a sorting criterion selected from the group consisting of core information, address information, cache level information, cache type information, set information, way information, valid bit information, dirty bit information and a least-recently used ranking.

* * * * *